US010369779B2

(12) United States Patent
Bauer

(10) Patent No.: US 10,369,779 B2
(45) Date of Patent: Aug. 6, 2019

(54) MACHINE FOR PRODUCING THREE-DIMENSIONAL SCREEN-PRINTED ARTICLES

(71) Applicant: Exentis-Knowledge AG, Baden (CH)

(72) Inventor: Jörg Bauer, Wirges (DE)

(73) Assignee: Exentis Knowledge GmbH, Stetten (CH)

( * ) Notice: Subject to any disclaimer, the term of this patent is extended or adjusted under 35 U.S.C. 154(b) by 116 days.

(21) Appl. No.: 14/893,235

(22) PCT Filed: May 22, 2014

(86) PCT No.: PCT/EP2014/001383
§ 371 (c)(1),
(2) Date: Nov. 23, 2015

(87) PCT Pub. No.: WO2014/187567
PCT Pub. Date: Nov. 27, 2014

(65) Prior Publication Data
US 2016/0121599 A1      May 5, 2016

(30) Foreign Application Priority Data
May 23, 2013   (DE) .................... 20 2013 004 745 U

(51) Int. Cl.
*B41F 15/08*    (2006.01)
*B41F 15/34*    (2006.01)
(Continued)

(52) U.S. Cl.
CPC .............. *B41F 15/34* (2013.01); *B41F 15/08* (2013.01); *B41F 21/04* (2013.01); *B41F 21/06* (2013.01);
(Continued)

(58) Field of Classification Search
CPC .......... B41F 15/00; B41F 15/08; B41F 15/34; B41F 21/04; B41F 21/06; B41F 21/102;
(Continued)

(56) References Cited

U.S. PATENT DOCUMENTS 4,242,401 A    12/1980  Mitani et al.
4,407,195 A *  10/1983  Jaffa ....................... B41F 15/10
                                                    101/123

(Continued)

FOREIGN PATENT DOCUMENTS

DE            4108651 C1    10/1992
DE      102008043543 A1     5/2010
(Continued)

OTHER PUBLICATIONS

"International Preliminary Report on Patentabiltiy" issued in International Application No. PCT/EP2014/001383; English translation, dated Dec. 3, 2015.
(Continued)

*Primary Examiner* — Matthew G Marini
*Assistant Examiner* — Marissa Ferguson-Samreth
(74) *Attorney, Agent, or Firm* — Kaplan Breyer Schwarz, LLP

(57) ABSTRACT

The invention relates to a machine for producing three-dimensional screen-printed articles, comprising a press bed with a printing screen, by means of which at least one printing object can be printed multiple times, wherein after each completed printing, the height can be increased by the application thickness of the previous printing.

14 Claims, 3 Drawing Sheets

Figure 1:
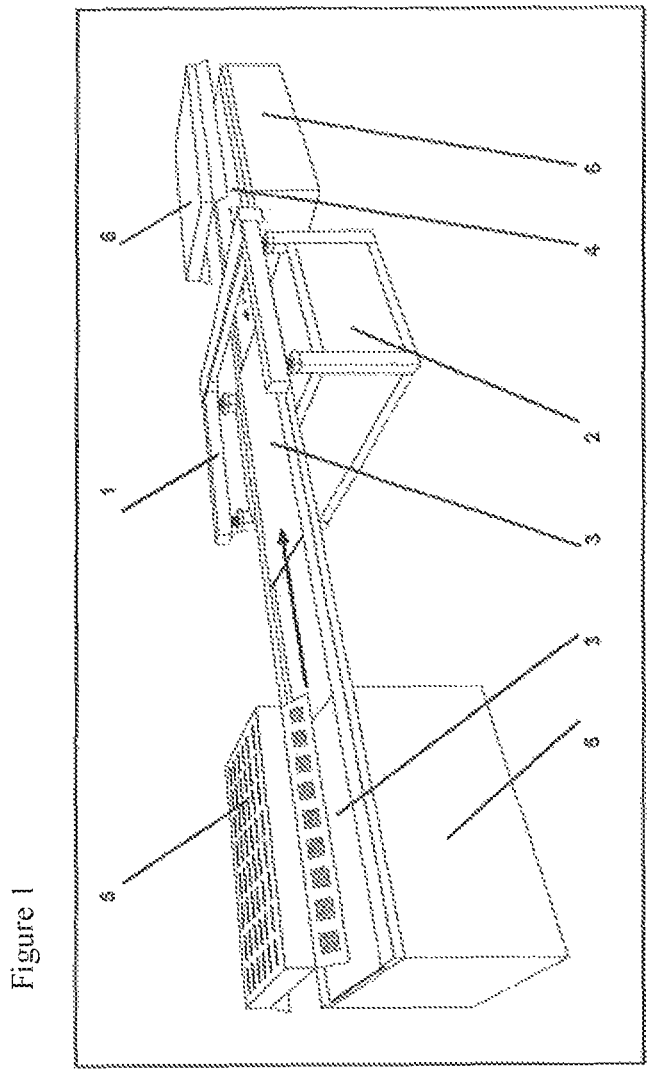
Figure 3:
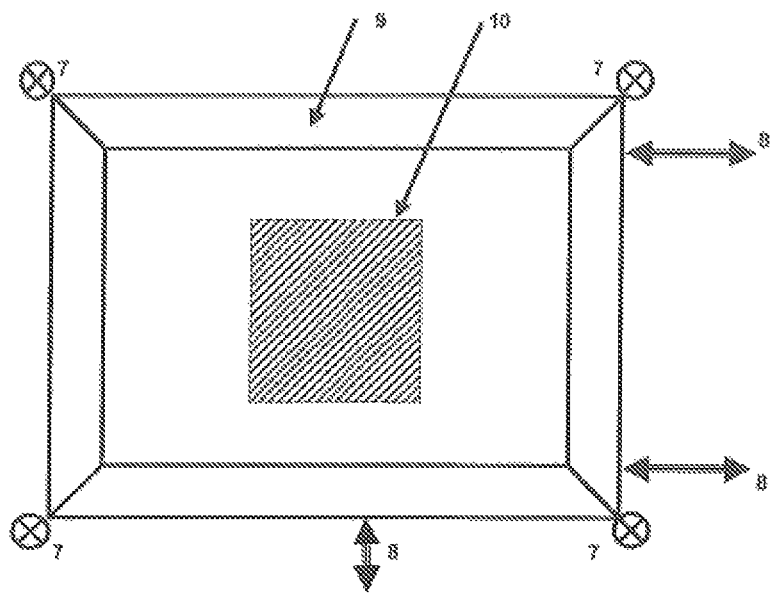
Figure 4:
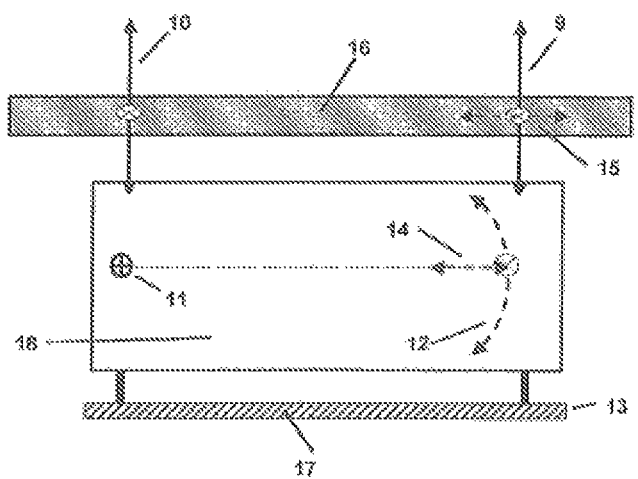

(51) Int. Cl.
| | |
|---|---|
| *B41F 21/04* | (2006.01) |
| *B41F 21/06* | (2006.01) |
| *B41F 21/10* | (2006.01) |
| *B41F 23/00* | (2006.01) |
| *B33Y 10/00* | (2015.01) |
| *B33Y 30/00* | (2015.01) |
| *B33Y 50/02* | (2015.01) |

(52) U.S. Cl.
CPC .......... *B41F 21/102* (2013.01); *B41F 21/104* (2013.01); *B41F 23/00* (2013.01); *B33Y 10/00* (2014.12); *B33Y 30/00* (2014.12); *B33Y 50/02* (2014.12)

(58) Field of Classification Search
CPC ........ B41F 21/104; B41F 23/00; B33Y 10/00; B33Y 30/00; B33Y 50/02
See application file for complete search history.

(56) References Cited

U.S. PATENT DOCUMENTS

| | | | | |
|---|---|---|---|---|
| 4,930,413 | A | | 6/1990 | Jaffa |
| 6,092,464 | A | * | 7/2000 | Meola ..................... B41M 1/12 101/123 |
| 6,568,321 | B2 | * | 5/2003 | Sakamoto ............... B41F 15/10 101/126 |
| 2004/0170459 | A1 | | 9/2004 | Taylor et al. |
| 2011/0297020 | A1 | * | 12/2011 | Tanaka ................ B41F 15/0881 101/126 |
| 2012/0055355 | A1 | * | 3/2012 | Li ....................... B41F 15/0818 101/123 |

FOREIGN PATENT DOCUMENTS

| | | |
|---|---|---|
| EP | 0627983 | 10/1996 |
| EP | 2021594 A1 | 2/2009 |
| JP | S55025304 A | 2/1980 |
| JP | H11235806 | 8/1999 |
| JP | 2002264294 | 9/2002 |
| JP | 2002331640 A | 11/2002 |
| JP | 2005138341 | 6/2005 |
| WO | 02/00437 A1 | 1/2002 |

OTHER PUBLICATIONS

"International Search Report" issued by EPO as International Searching Authority for International Application PCT/EP2014/001383 dated Dec. 5, 2014.

"Japanese Office Action", in counterpart Japanese Patent Application No. 2016514300, dated Oct. 24, 2017, 14 pp.

"Office Action", Parallel Japanese Patent Application 2016-514300, dated Mar. 30, 2018, 5 pp.

"rapidX 2010 Schneller and umfassend zu Anspruchsvollem", dated 2010, Publisher: Hanser, www.rapidx-online.de.

* cited by examiner

Figure 2

| Step | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| Start | N5 | N4 | N3 | N2 | N1 | Transport path 1 ||||| Print || Transport path 1 ||| N6 | N7 | N8 | N9 | N10 |
| | Table 1 – copies N1 to N5 ||||| |||||||||| | Table 2 – Copies N6 to N10 |||||
| Print N 1 | | | | | | Transport path 1 |||| Print station || Transport path 1 ||| | N6 | N7 | N8 | N9 | N10 |
| Print N 2 | | | | | | | | N5 | N4 | N3 | N2 | N1 | | Transport path 2 ||| N6 | N7 | N8 | N9 | N10 |
| | | | | | | | | Transport path 1 ||| Print station |||||||||
| Print N 3 | | | | | | | | | N5 | N4 | N3 | N2 | N1 | Transport path 2 || | N6 | N7 | N8 | N9 | N10 |
| | | | | | | | | | Transport path 1 || Print station |||||||||
| Print N 4 | | | | | | | | | | N5 | N4 | N3 | N2 | N1 | | | N6 | N7 | N8 | N9 | N10 |
| | | | | | | | | | | Transport path 1 | Print station || Transport path 2 |||||||
| Print N 5 | | | | | | Transport path 1 |||| N5 | N4 | N3 | N2 | N1 || | N6 | N7 | N8 | N9 | N10 |
| | | | | | | | | | | Print station || Transport path 2 ||||||||
| Print N 6 curing N1-5 | N5 | N4 | N3 | N2 | N1 | Transport path 1 |||| N6 | N7 | N8 | N9 | N10 | Transport path 2 ||||||
| | | | | | | | | | | Print station ||||||||||
| Print N 6 curing N1-5 | N5 | N4 | N3 | N2 | N1 | Transport path 1 |||| N6 | N7 | N8 | N9 | N10 | Transport path 2 ||||||
| | | | | | | | | | | Print station ||||||||||
| Print N 7 curing N1-5 | N5 | N4 | N3 | N2 | N1 | Transport path 1 |||| N6 | N7 | N8 | N9 | N10 | Transport path 2 ||||||
| | | | | | | | | | | Print station ||||||||||
| Print N 8 curing N1-5 | N5 | N4 | N3 | N2 | N1 | Transport path 1 |||| N6 | N7 | N8 | N9 | N10 | Transport path 2 ||||||
| | | | | | | | | | | Print station ||||||||||
| Print N 9 curing N1-5 | N5 | N4 | N3 | N2 | N1 | Transport path 1 |||| N6 | N7 | N8 | N9 | N10 | Transport path 2 ||||||
| | | | | | | | | | | Print station ||||||||||
| Curing N6-10 print height change | N5 | N4 | N3 | N2 | N1 | Infeed path 1 |||| Print || Transport path 2 ||| | N6 | N7 | N8 | N9 | N10 |
| | Curing station 1 ||||| |||||||||| | Curing station 2 |||||

MACHINE FOR PRODUCING THREE-DIMENSIONAL SCREEN-PRINTED ARTICLES

FIELD OF THE INVENTION

The invention relates to a three-dimensional screen printing system technology for producing 3-dimensional screen printed bodies, and to the use of the 3-dimensional screen printing machine.

BACKGROUND OF THE INVENTION

Introduction

As three-dimensional screen printing processes have become established for the production of molded bodies, a deficiency of available system technologies has developed. At this point in time, there are only two independently developed and constructed prototypes of the system technology which have been used to carry out the technical method of 3-dimensional screen printing. Without naming the specific system parts and functions necessary for 3-dimensional screen printing, the systems fundamentally consists of a press bed, flat bed, a four-column lifting unit, and a doctor blade unit. Previous publications on 3D screen printing methods show these experimental systems without disclosing their specific construction, design, and function. Research and development partners who have necessarily been shown at least individual components and functions of the system technology as part of research and development activities are bound by confidentiality agreements. We are not aware of any manufacturer which has implemented the specific process requirements for 3-dimensional screen printing in an engineered system, aside from our own prototypes developed in-house. As a result, independent third parties at this time cannot use the method in research, development, or production, based on 3-dimensional screen printing processes or 3-dimensional screen printing system technology.

The basis for the engineering standards and construction is the method described in EP 0627983 A1 for the production of molded bodies with a prespecified pore structure. In this context, a molded body is produced layer by layer, by a body layer being printed, the layer being cured, a new printing operation being performed on the previous layer, and then cured in turn. For a change in structure, which can be both a change in structure and in material, the screen tool is changed, then printing is resumed in layers. Materials used include ceramic, metal, glass, plastic, and mixtures of the same material groups, or composite mixtures. The 3-dimensional screen printing method itself was developed on the basis of diesel soot particle filters, implants, and absorbers, including solar heat absorbers, heat exchangers, so-called flow fields, reactors, and additional functional components. The absorber technology possibilities are described in EP 2021594 A1. The most commonly used materials for the development of the method in the group of ceramics are silicon carbide, corundum, aluminum oxide, zirconium oxide, cordierite, phosphate ceramics, and on to clay-containing ceramics. Development in the glass sector concentrates on the use of recipes containing silicon. Process suitability in the metal sector was developed using stainless steel, ferrous metals, coppers, aluminum, tungsten, molybdenum, and others. Method development using plastics such as acrylates and silicones was also successful. The focus of development in this case was method development, product development, and most of all possible recipes and processability in 3-dimensional screen printing methods.

The necessary systems engineering developments for 3-dimensional screen printing methods led in our own experimental and application devices for systems technology to the systems technology, and the system application as a 3-dimensional screen printing machine and 3-dimensional screen printing system components on which this invention is based, along with the use of the developed system technology.

Our own method disclosed in EP 0627983 A1, "Method for the production of molded bodies with a prespecified pore structure," can be listed as the prior art, as well as the use patent EP 2021594 A1, "Device through which a fluid can flow, designed as a solar receiver", based on the method and likewise from our own development. Additional publications on 3-dimensional screen printing methods relate to the 3-dimensional screen printing method itself. Photocopies of both of our own prototypes of the system technology, presented therein, only show rough system images with no technical details or functions of the 3-dimensional screen printing, and do not constitute a disclosure of the system and functional technology of the 3-dimensional screen printing machine. In none of the photocopies of system prototypes in the publications during the method development are solutions shown for systems and functional technology.

The first and second prototype systems were developed and used in our own research operation.

A number of screen printing systems are known from the literature and history of screen printing itself, and these are available on the market. These do not have the features of a screen printing system for 3-dimensional screen printing methods, are not intended for such a use, and are also not suitable in the published designs for producing bodies using a 3-dimensional screen printing method. Offers by machine manufacturers for customer-specific modifications of hardware and software to specific requirements, said offers kept general in nature, likewise do not constitute a disclosure or prior publication of a 3-dimensional screen printing system or the components and functions thereof.

By definition, the frequently used term 'object printing' means printing on an object, but not printing the object itself. An example is printing lettering or a logo on a lighter or pen. In rotary printing, an example of object printing is the printing of a cylindrical piston with a protective glide layer of carbon; an example in a technical application is the printing of a seal on a housing part such as an automatic transmission gear selector plate, for example. In such cases, for flat printing, rotary printing, and other types of printing, an object is always printed on. The printing itself does not create the object itself—as in, for example, the design on a fleece. None of the objects or printing machines named above has a causal connection to an actual, 3-dimensional screen printing or the system/method technology thereof.

To provide discrete assignments of positional details in the following invention, plane parallel surface positions on the plate receiving the print—also called the press bed—are given for the vertical height indications on the Z-axis—also called the application axis, which is Z=0.000 mm in the starting position. This starting position can also be indicated by the thickness of the medium being printed—by way of example the thickness of the paper which will be printed, or the height of the component, of an upper housing side being printed, of the surface of a lighter being printed, or other objects. The direction of transport of the printed article—the movement direction of the press bed(s)—is indicated on the axes as the x-axis, or the abscissa. The Y-axis needed for positioning, also termed the ordinate axis, forms a plane parallel surface with the x-axis. The term 'printing object' does not mean the number of objects in the printing surface of the screen or template, but rather defines the number of print surfaces of a layout on a press bed.

Problem of the Invention

The invention aims to provide an improved system for the production of three-dimensional screen-printed articles.

The problem addressed by the invention is that of a system technology for screen printing -or in a special variant, template printing—by means of which it is possible to produce objects via a 3-dimensional screen printing method. The solution to the problem addressed by the invention of a 3-dimensional screen printing system should include both the function as a 3-dimensional screen printing system, technical components for the 3-dimensional screen printing system, and the use of the 3-dimensional screen printing system itself for the production of bodies using a 3-dimensional screen printing method, consisting of the material groups including ceramics, metals, glasses, plastics, additional organic and inorganic materials, and biological materials, and mixtures of same.

SUMMARY OF THE INVENTION

The problem addressed by the invention is solved by a system for the production of three-dimensional screen-printed articles according to claim 1.

Preferred embodiments and implementations of the invention are found in the subject matter of the dependent claims.

The invention relates to a machine for the production of three-dimensional screen-printed articles—that is, a machine which produces an object using a screen printing method, wherein a three-dimensional body is constructed by a plurality of printed layers.

The machine comprises a press bed with a printing screen.

At least one printing object can be printed multiple times by means of the printing screen.

The term 'printing object' is used to mean the surface which is printed by means of the machine.

This can often be a bed on which a substrate can be arranged.

According to the invention, after each printing operation, the printing height is increased by the application thickness of the previous printing.

That is, after each printing operation, the distance of the printing screen to the substrate and/or to the object is preferably increased, with the effect that the application thickness of the following printing matches the desired parameter very precisely.

In one implementation of the invention, the press bed has a plate with multiple printing objects.

Due to the use of a plate with multiple printing objects, it is possible to greatly increase the speed with which three-dimensional objects are created, by printing multiple printing objects in one printing operation, and therefore constructing multiple objects which can have the same or different designs.

The plate can preferably be transported into a curing unit along with the printing objects.

In particular, the plate is moved into a curing unit after each printing operation.

Preferably, multiple plates can be cured simultaneously in the curing unit.

The curing unit can comprise a plurality of receptacles, for example, in order to simultaneously cure multiple plates.

As such, different plates can be inserted into the printing station in alternation, so that other plates can be printed during the curing times.

The system throughput can be significantly increased in this way.

In one implementation of the invention, the system has at least two curing units and/or curing stations, from which the press bed can be furnished with plates of printing objects.

These curing stations are preferably arranged adjacent to the printing station, wherein curing units are arranged on at least two sides of the printing station, and preferably on four sides of the printing station.

The printing station can therefore be furnished with plates from different directions.

In addition, the plate preferably comprises a plurality of positioning marks.

These positioning marks are preferably each functionally assigned to one printing object.

Due to temperature changes during curing, a change in the size of the plate can occur.

The size of this change can be detected by means of individually assigned position marks, and can be taken into account during the controlling of the printing station.

Therefore, according to the invention, in contrast to conventional screen printing systems, a screen printing system method technology is claimed which makes it possible to print multiple print layers on the same printing object carrier one after the other, and in the process to increase the distance from the printing object carrier which receives the print, wherein Z=0.000 mm at the bottom of the screen or the template—also called the printing side—for each subsequent printing layer, by the sum of the application thickness H of the printing which was carried out previously, such that the value A, generally termed the screen printing plate distance, or also the height, forms a constant despite the variable total height $\Sigma H$ from the addition of the individual print layers, or follow a height adjustment function f(a) incorporated into the 3-dimensional screen printing. In contrast to the prior art for the system design of screen printing systems, in which a height adjustment is set prior to the start of printing, during the setup phase of the screen printing system, and this does not change over the entire process, with the reference point to the zero position of the press bed constant at the starting position Z, Z=constant , the height adjustment changes with respect to the zero position Z in the 3-dimensional screen printing system with each printed layer, by the application thickness H of each printed operation Z=f(H).

According to the invention, in contrast to the prior art, in which only one height adjustment is set prior to the start of the production process, during the setup phase, generally by raising or lowering the superframe of the printing machine then fixing the position using mechanical, electromechanical, or electrical devices, or pneumatic clamping devices such as clamping screws, quick clamps, eddy current brakes, spring steel clamps, and other braking and locking devices known to a person skilled in the art, which fix the columns which determine the lift, following each printing operation for one print layer on one object sequence, according to the design, lowers the press bed(s) to the printing position by the magnitude of the printing application thickness, or lifts the printing screen, the doctor blade, and the flood bar, optionally with the printing unit frame, which is termed the printing superframe, by the application thickness of the printing. In this case, the lifting process can preferably, but not exclusively, be started once the flood bar has passed—that is, before the flooding process has set in. This advantageous most of all in cases where one object is printed on a press bed, because the lift modification process involves a great deal of positioning time due to the small specifications of 0.2 μm to 250 μm per height adjustment change. In the claimed 3-dimensional screen printing system, in the case of multiple press beds each having one printing, or one press bed with multiple objects per press bed, and/or multiple press beds each with multiple objects, the height adjustment takes place preferably after the printing of all selected object positions.

While height specifications for the printing are known in the prior art, these are not used for the adjustment of the plate height, or even for a modification of the plate height, but rather are carried out for the purpose of adjusting the color mixture, color intensity, and other settings related to the quality of the printed image according to the invention, in the claimed 3-dimensional screen printing system, the height specification of the print—in this case the print layer of a printing operation which determines the height—is determined in such a manner that the height value is subtracted prior to printing from the measurement of the height following the printing of the flat layer in order to obtain the in-process value of the application thickness of the printing operation just carried out. This height difference value so obtained provides the value of the height adjustment to be carried out.

In the 3-dimensional screen printing method according to EP 0627983, experiments using various materials and layouts during research and development showed that this height adjustment value ends up between 0.0002 mm and 0.2500 mm, according to the grain size and grain shape of the material used. Various experiments for the height determination showed that it is advantageous to determine each printing operation, and not to use an average calculated value from multiple printing operations. This is due to the fact that it was surprisingly shown that in the 3-dimensional screen printing method, the modification of parameters by modifying viscosity of the recipe mixture, temperature, the atmosphere in the printing area, the frequency of addition of fresh mixture, manually or via a dosing system, and the resulting printing formulation of the already printed mixture and freshly added moisture can specifically change the individual height buildup of the individual print layers, apart from each other, by up to 25 percent. A further parameter which influences the modification, which is relevant to the application thickness, is the transition between the first starting print, in which the flood bar is still on the printing substrate, and the free object printing in which that flood bar is only on the object itself. In addition, the height buildup is subject to a change in the behavior of the screen over time and over the printing process. The original screen values only settle into a stable operating state over a longer period of time, such that changes in the application thickness also result therefrom.

The measurement itself for the claimed 3-dimensional screen printing system is carried out with a measurement contact, but is preferably contactless. In this case, measurements can be performed in the simplest case using sensors. However, this requires a measuring time point after the curing. Otherwise the print surface can be damaged. This measurement method disadvantageously lengthens cycle times in the 3-dimensional screen printing system. In the inventive measurement method for the 3-dimensional screen printing system, visual measurements can be used, but require highly-qualified, trained personnel and a longer measurement time period, and deliver a relative height buildup measurement which depends on the individual. The same is true for electrical, gravimetric, or acoustic (ultrasound) measurements, which are nonetheless possible. It has been shown that it is possible to carry out an electronic measurement using lasers, laser diodes, and a corresponding analysis, even during the transport process of the object in the system, if the reference position is mechanically stable. In this case, the best position of the measuring devices is the height position of the lower edge of the screen holder—especially the bottom-edge position of the printing screen. This is particularly true because the measurement area, even for objects which are several centimeters high, does not change with respect to the starting state. If the height measurement in the inventive system technology of the 3-dimensional screen printing system is carried out during the transport of the object, it is then additionally possible—without taking additional measuring time—to either print a measurement part in the layout for the purpose of height measurement, or to produce a measurement series over the object in order to thereby obtain an analyzable average from a measurement series of a print layer. This is primarily advantageous if the object has a structure with different material densities which also influence the height buildup. For flat printing, this value has no significance. However, in the 3-dimensional screen printing method, it is highly relevant due to the addition of up to thousands of print layers. This is because even a 1 μm application thickness difference, at, for example, 10,000 print layers, would make a difference of 10 mm which need to be compensated for. If one object on one or multiple press beds is printed as multiple objects on one or multiple press beds, the measurement can be reduced to one object. However, a continuous measurement of all objects significantly increases precision. If the object experiences shrinkage during the printing process, which to date has been avoided by using special recipes and curing processes, but cannot be completely ruled out, the measurement of the phase which produces the shrinkage the application difference with respect to the previous printing operation, which is required for the height adjustment, must be obtained first. This can involve, in unfavorable circumstances, compacting of the object below due to the weight of the object itself, the curing process, or the cooling process. The application thickness, or, rather, the height difference with respect to the prior printing, is preferably determined by more than one measurement position.

In the system technology, the superframe of the printing system has great importance in the 3-dimensional screen printing method. The construction thereof determines the system components which create shapes. The 3-dimensional screen printing system according to the invention has a multifunctional superframe which is able to influence various different shaping parameters. One component is the screen holder, preferably designed as a master frame construction for a flat or hanging screen. The screen holder in this case can and must be able to be oriented in all positions, not only to position the screen in the X- and Y- directions, but also at all corner points of the master frame and the screen frame holder in the Z-direction, each independently of the other. A screen changing device, either by screens inserted from outside or by integrated screen positions for alternating screens, should not only enable the printing of a layout in the screen printing system according to the invention, but also the printing of different layouts and recipes. As an alternative, the printing station can also consist of multiple printing superframe stations. The same applies to the flood bar unit with the doctor blade and flood bar. This option enables, in a divided layout, the option of simultaneously printing multiple materials in one printing screen. During the research and development phase for the 3-dimensional screen printing method and the 3-dimensional screen printing system, it was also noted that the complete superframe assembly which carries out the printing can be changed during the buildup of the object for the purpose of changing layout and recipe. This is technically complex, however. Yet in regard to changing time, it requires significantly less process time. Preferably, but not necessarily, the printing screen can be shifted and/or rotated, and in the process the direction of the movement of the flood bar drive can be, but need not necessarily be, accordingly influenced in such a manner that it is possible to maintain the same mesh direction and printing direction during the printing operation. This is particularly advantageous for maintaining the precision of fit of the underlying printing layer. In one simple design, only the printing screen position is changed. However, as an alternative, the printing under the printing screen can be modified, either by modifying its printed surface or by modifying the position of the entire press bed.

A further essential method and system component of the 3-dimensional screen printing method is the integration of a blower unit into the 3-dimensional screen printing system. It has been shown that, in contrast to the prior art in which the printing formulation—ink in this case—is applied at a high turnaround rate, in the 3-dimensional screen printing method it is necessary to influence the atmosphere surrounding the printing, particularly by the frequently particulate recipe components. According to the invention, a gas is utilized for the 3-dimensional screen printing system. In the simplest case, the gas serves the purpose of compensating, by means of a fog, for evaporation of batching water from the printing formulation on the printing screen, and simultaneously minimizing drying of the printing formulation in the meshes during the time between printing and flooding. In a further embodiment, for this purpose the atmosphere is gassed with solvent, a protective gas, or a reaction gas. If the composition of the printing formulation overall is sensitive to certain gases or moisture, the formulation-conveying components of the 3-dimensional screen printing system can also be completely surrounded by the gassing unit, as can be the transport regions of the press bed objects and the path to the curing unit. The space which is gassed should either be hermetically sealed off against unintended gas flows, or can be operated with at least a slight overpressure of the protective or reaction gas. As a further option, the partitioning or the overpressure unit can also be used to fulfill certain cleanroom class conditions with respect to particulate contamination, which is advantageous for electronic objects or for medicinal objects—for example implants and other bodies. As an additional option, the overpressure operation or the partitioning, and the gassing, create the possibility of adjusting a specific moisture and temperature, including, but not necessarily requiring the water content and the temperature near the object, either by the gassing medium or by corresponding cooling and/or heating elements. It has been surprisingly shown for several experimental printing formulations that the formulation cooled multiple degrees Celsius by evaporation, without the heat of the doctor blade friction, or the desired or undesired heat applied to the printed article during the curing being able to compensate for this loss of heat. The associated viscosity change in the printing formulation therefore had to be taken into account in preparing the recipe. If the printing formulation has volatile components, overpressure operation and cooling can minimize the emission of these volatile components. If flammable substances are used in the printing formulation, all ignition sources in the 3-dimensional screen printing system must be constructed accordingly in an explosion-proof design, and/or ignition of the combustible components must be prevented in a protective atmosphere. According to the invention, the explosion-proof design must also particularly take into account static charges and discharges created by material friction.

It is known from EP 0627 983 that, after the printing of a flat layer, the printed layer is strengthened before the subsequent plane is printed. The strengthening in this case should be performed by chemical, thermal, or physical curing. According to the prior art, drying, cooling, evaporating, or transport passages are certainly known, but each constitute separate processes and are positioned at the end of the printing process—normally the application of ink—and constitute an independent, self-contained process related to one-dimensional printing.

In the 3-dimensional screen printing system according to the invention, the curing, which is embodied conventionally in its function as a drying unit, is a component of the printing process. This is because the preparation of the object for the subsequent height-building printing step is carried out in the process. If a press bed with one or more objects is used, the curing unit can be positioned on one side thereof. If two press beds with one or two sides are used, the press beds can be fed from up to four directions of the printing station; up to four curing unit positions are solutions in the arrangement of the curing unit components. In this case, in the 3-dimensional screen printing system according to the invention, all objects of one press bed are printed one after the other, and then subsequently cured at the same time. The resulting shortening of the system size and the time required for the curing per object is utilized according to the invention for the claimed 3-dimensional screen printing system. Likewise, the possibility of changing or combining the source which achieves the curing—for example but not exclusively electrical light sources and/or heat emitters, fog or spraying devices, is a design element of the 3-dimensional screen printing system according to the invention.

The illustration in FIG. 1 illustrates and claims, as an example for a plurality of 3-dimensional screen printing system designs, a system sketch which serves the purpose of explaining the primary components of the system and the function of the system. In this illustration, No. 1 is the superframe of the 3-dimensional screen printing system, No. 2 is the station which preferably contains not only drive positioning elements but also the important system control elements. No. 3 is a press bed—in this case an elongated press bed with multiple printing objects. No. 4 is a second press bed, likewise with multiple printing objects. No. 5 depicts the curing unit for the first press bed. No. 6 is the second curing unit for the second press bed.

In the embodiment, printing is carried out at a right angle, in the Y direction, to the bed transport direction X. In the 3-dimensional screen printing system presented by way of example, the position of the press bed 1 is printed for 10 printing object copies. This position is then transported under the first curing unit No. 5 in which the first ten copies are cured. During the exit of press bed 1 from the printing station, the second press bed is transported into the printing station, where ten copies are likewise printed directly one after the other onto the press bed. While the second press bed travels out of the printing station under the second curing unit No. 6 to be cured, the 3-dimensional screen printing system superframe is lifted to a degree corresponding to the print application thickness measured value which was performed on press bed 1 in the meantime. In a constant alternation, press bed 1 travels into the printing station, then into the first curing unit, press bed 2 travels into the printing station, and from there under the second curing unit, and so forth.

The printing scheme for the exemplary design with two elongated press bed with multiple printing object is illustrated in FIG. II. In this case, according to the invention, printing is performed orthogonally—that is, in the Y direction—to the bed transport direction X, because in this way it is possible to minimize the distance ΔX between the printing object copies, such that it is possible to accommodate a maximum number of printing objects per press bed. In a simplified design, the 3-dimensional screen printing system is equipped with a press bed for the purpose of producing objects, as illustrated in FIG. I with two press beds, or also, using the same type of transport, up to 8 or more press beds and curing units—comparable to pieces of a pie with the printing station in the center thereof. If there are more than 2 press beds, the printing stations, and/or the printing superframe, and/or the printing screen and the doctor blade and flood bar drive, can be rotated according to the station arrangement of the printing transport direction X by the same degree in order to enable the orthogonal printing direction with minimal distance ΔX between the printing objects. ΔX is the sum, right and left, of the blade overlap to the layout, which is less than the sum of the blade infeed and outfeed path. If a long press bed is used, by way of example, the number of possible printing objects grows with a smaller layout in the printing screen—in the worst case, with one object in the layout surface of the printing screen, the number of the objects which can be fed together to the curing in one work step.

If one or more further materials are printed according to the design, for example in the case of multi-layer material objects, this can be performed by one of more further centrally arranged printing presses, or also by further printing stations which follow upon one another in the negative press bed transport direction –X. The alternative embodiment of the press bed as a round bed, either as a semicircle or a closed circle with one press bed or multiple press beds connected in series, is obvious in this case for the design of a 3-dimensional screen printing system.

Such a system constitution of the 3-dimensional screen printing reduces cycle times to a significant degree, in the present batch operation with long pause times for the printing in the screen printing system, compared to conventional screen printing technology in which production proceeds in a line—that is, with a short pause of the part being printed in the printing system. The long single cycle times result from the necessity of stabilizing the individually printed print layer in the 3-dimensional screen printing method prior to the following print layer, such that the following printing can bind to the printing below, on the one hand, and on the other hand the already printed element consisting of more than one print layer is not deformed by the pressing force of the following print layer, or the weight thereof which is formed overall.

Corresponding to the inventive thinking, the 3-dimensional screen printing system has a plurality of method-specific constructions and design details which enable a standardized 3-dimensional screen printing of a body.

According to the invention, it was possible to realize, as an essential core component for the 3-dimensional screen printing system, that the lift unit for the printing superframe, and/or the lowering unit for the press bed, must have special properties compared to conventional screen printing systems for one-dimensional screen printing.

The first relevant group of the 3-dimensional screen printing system to be mentioned is the system component by means of which is possible to measure, set, and control the printing height.

It has been discovered that it is essential that, for superframe lifting, a central lift device can be used—such as a servomotor or step motor with a chain or belt drive, but there must be a possibility of correction on all lifting axes in order to compensate for the variable component expansion which occurs over the lifetime of the system. In the simplest case, this an integrated belt or chain tensioner which compensates for the differences in expansion by means of mechanical or electronic control. In this case, such a device can also be controlled by measuring devices attached to the lift unit or superframe. This embodiment of a lift unit for the superframe provides exceptionally good results for simple printing of objects in the 3-dimensional screen printing method, but not for fine and high-precision print layer thickness applications.

A second embodiment of the lift unit of the printing superframe for 3-dimensional screen printing systems is a non-central drive of at least two lift unit axes at the same time -preferably one at the print infeed and one at the outfeed, likewise controlled and compensated for mimicked changes.

In the third embodiment of the lift unit of the printing superframe for 3-dimensional screen printing systems, there is a decentral drive of all lift unit axes of the superframe at the same time, preferably one on each corner of the printing superframe, wherein the position of each lifting axis is monitored using sensors and can be controlled.

For each embodiment of the lift unit of the printing superframe for 3-dimensional screen printing systems, it has been shown that position fixing of the lift columns is necessary with increasing structural fineness of the object. Likewise for increasing quality, this a simple motor brake for the central drive, a motor brake on the two and/or four drive devices, followed by a clamping fixation of the lift columns against the machine frame. However, the highest precision in a 3-dimensional screen printing system is achieved by a fixed support on each lift column axis. This fixed support according to the invention is a support on which the superframe is lowered by the lift drive. In this case, the support according to the invention can simultaneously take over the function of height adjustment by changing the position of the support surface more or less for the lift adjustment. The functional advantage is a fixed stop in each superframe position, with the possibility of changing the position of the same in dimensions of 0.0002 mm.

According to the invention, it has been shown that uncoupling the weight of the lift unit drive is advantageous for the precision of reproducing the positioning. This can be performed in such a manner that a counterweight is opposed during the height adjustment to the weight of the superframe. This counterweight can be generated by a simple pressure cylinder which is adjusted to the superframe weight at each of the superframe corners—for example using compressed air, hydraulics, or electronics. A counterweight using a weight mass is possible, but overall negatively impacts the weight of the superframe. The counterpressure devices according to the invention simplify the balancing out of the load on the lifting axes, and significantly increase the reliability of the positioning. If a fixed stop is also used for the position adjustment, this then counteracts the change in the lift axes load, and the associated position change due to natural material expansion and bending due to static and dynamic load changes.

The increasingly highest precision according to the invention in the lift positioning and the stability of the position during the printing process—in this case most important the flooding step and the measurement of the printing application thickness—is performed in increasing order by a drive brake and/or lift column clamping and/or counterpressure device and/or fixed support and/or an additional separation of the lift axis and the guide axis. It has been shown that the stability of the superframe resulting from the use of additional guide columns not only has a positive effect on the reliability of the position with respect to the print height, but also on the dimensional stability of the printed image positioning. As such, according to the invention, the possible, optional attachment of separate guide columns with no lift function, according to the required positioning precision, is claimed. If the guide column according to the invention is used to guide the lifting or lowering of the print superframe, the lift drive construction can be given a minimized design if the counterpressure elements are used at the same time, and if a fixed support is used to fix the position of the superframe. In contrast to the simple reduction of weight of the superframe up to weightlessness of all axes at 0 kilograms—floating—on each lifting axis, to the unloaded fixed support adjustment, which can then even be carried out using the smallest, low-power motors, in the print height adjustment according to the invention, a moderate load should remain on the lift device in order to minimize position changes resulting from load increases in the bearings. In the development of the invention of the 3-dimensional screen printing system, it has been shown that, without a stabilizing measure being implemented, not only could the static positioning precision be significantly improved, but also the dynamic weight change caused by the flood bar pressure and the flood bar beam weight shift along the bar path can be compensated with a displacement of the balance point of the printing superframe in the X direction. In simple, two-dimensional printing, this factor is essentially meaningless, but is significant in 3-dimensional screen printing method due to the plurality of print layers and the summation of errors.

Under the same equipment features, the position change of the print height can also be performed by lowering the press bed. Although the function has the same precision results and can be carried out, it should be considered disadvantageous from a structural point of view that increasing press bed size and printing object length of the press bed results in increasing system component size which needs to be positioned. In addition, the positioning of the guides of the press bed and the bed drive thereof, for positioning travel paths up to more than 10 meters, is substantially more susceptible to faulty positioning. The positioning of the print height inside of the accordingly fixed superframe is likewise possible. In this case, it is only necessary to position the screen holder and the flood bar unit with its guides. However, for a lift change via the screen and printing unit, it is no longer simple to house the required lift equipment. It is functionally feasible in the construction of the 3-dimensional screen printing system, but is difficult in actual construction, with the exception of several specialized applications.

The second relevant group of the 3-dimensional screen printing system to be mentioned is the system component by means of which is possible to transport, print, and cure the object in the 3-dimensional screen printing system.

In contrast to the prior art, in 2-dimensional screen printing, the press bed(s) are subject to a long pause time in the printing system, and are subjected to a cyclical alternation of operating conditions as a result of the curing integrated into the printing system. The press bed position also differs due to the possibility of multiple printing object on the press bed. It has been shown that conventional press beds tend to deform under long-term vacuum load, and demonstrate concave deformation. In addition, the bed dimension proceeding from the bed stop, and/or proceeding from the bed drive position anchoring, changes over the course of long-term use. While the curvature leads to uneven flood bar pressure and the impression of the individual print layers of the object can assume different heights, the bed expansion results in a relative layout shift over the print layers. Because the heat created during the curing, adding a cyclical load, leads to a delocalization of the printed image -simply put, to tilted object walls out of the in-plumb Y axis—the stability of the object also suffers due to the resulting overlap of the print layers. In particular, the aspect of multiple printing objects on one press bed has led to the solution of the problems of conventional press beds in the use thereof for 3-dimensional screen printing. Because it has been shown that it is possible to fix the print substrate to the press bed by means of a minimal vacuum, using very low quantities of power, the press bed is preferably equipped with a small vacuum volume. The best results were achieved with double plates which have vacuum-guiding grooves on both sides. Then the vacuum bores acting on the print substrate are inserted into the point of interface of the vacuum grooves. In general, any press bed construction designed for a long-term vacuum can be used for the 3-dimensional screen printing system. For the purpose of compensating the long-term vacuum deformation, in a classic press bed construction with a high vacuum chamber volume on the underside of the bed, a combination of compensation bores—for example equipped with automatic valves -the loss of vacuum on the upper side of the bed can be compensated so that the tendency to curve is suppressed. However, in this case, the required vacuum power of the vacuum generating assembly must be taken into account. In any case, in a 3-dimensional screen printing system, the negative effect of the classical lateral channel compressor with respect to transmitting vibration to the actual printing system, emitting noise, and most of all producing heat should be avoided in 100% switched-on long-term operation, preferably by the use of quiet, oil-free membrane pumps or oil-free rotary vane pumps which preferably should be arranged outside of the printing station—for example underneath the curing units.

The second press bed aspect is the positional stability of the press bed in the X direction for each printing object of the print. While in classical screen printing the known press bed positioning is absolutely sufficient, this not the case for 3-dimensional screen printing. Although the known advancement methods using controlled travel detection are adequately precise for very simple objects and single-object printing, they are not for finely structured object, or in multi-object printing. According to the invention, it has been shown that the press bed can be driven pneumatically, hydraulically, electrically, or mechanically, either from two sides or centrally at the center point of the Y axis of the press bed—but preferably when the press bed travels into the printing station at the start of the press bed. A drive arrangement in the classical center of the X axis of the press bed is possible, but leads to the exertion of pushing and pulling tension and different loads on bed bearings, with resulting positioning imprecision. Because a large, and in the present embodiment long, press bed is equipped with a plurality of printing position which can also be variably adjusted, the positioning of the press bed in the X dimension must preferably, but not exclusively, be arranged in the layout center of the object printing being carried out. The absolute positioning and position fixing should be arranged in the layout center of the printing object, and be designed to act on both sides in order to prevent press bed shifts in the Y axis direction. Designed in this way, the heat expansion of the press bed at each layout point independently of each other only affects the positioning precision, even if overall, by way of example for twenty printing objects on a press bed, the heat expansion increases twenty time from one end of the press bed to the other, the effective heat expansion for each individual object is only a factor of 1. For fine positioning and bed fixing during the printing process, parallel clamps, pneumatic or hydraulic cylinders, magnetic holders, conical, pyramidal centering, or trapezoidal fixing device, or similarly working element, and/or axis clamp devices, are preferably suitable, but not necessarily implemented. The fixing devices must be shared so that they push, compress, pull, allow the gliding of, or attract the press bed to the prespecified position in the middle of the respective print layout. The positioning via an end stop with a fixed element, preferably in the geometric center of the printing screen above the same, and one or more stop counterpressure elements according to the number of the printing objects, with or without dampers, working on each enter point of the printing object layout center points, is/are a solution for fine positioning of the bed for the 3-dimensional screen printing system—with the requisite that the print layout is arranged centrally in the screen. The important advantage of a mechanical positioning and fixing of the press bed is the elimination of complex measured value determinations, evaluations, and calculations for the bed position via the bed drive system, because the layout center point remains the center point under all operation conditions. As such, a motor drive with incrementally detected values can certainly approach a position of a bed precisely, although for increasing drive weight with proximity controls which take longer, but cannot hold said position constant over variable operating conditions, most of all temperature and weight. In addition, a chain, belt, shaft, piston, or sliding drive is suitable only for a press bed position under the variable operating parameters. In contrast, a pairing of conventionally controlled drive technology—for example via an Omega belt drive arranged centrally in the Y axis of the table, which according to the invention constitutes the optimum drive type for 3-dimensional screen printing systems, approaching multiple positions of the press bed is possible if a fine positioning is carried out in each printing object center point via a fixing element. With the use of a drive with a stop point, a 3-dimensional screen printing is possible, but in this case it is necessary to determine, with great effort the dimensioning change of the press bed depending on position, and to permanently correct the control position for the press bed. Because the change parameters of belts, chains, shafts, spindles and axis generally additionally are incorporated into the control position calculation, this only possible as a solution for the 3-dimensional screen printing system, for positionings loaded with the summation of possible errors, when precision requirements are lower.

For three-dimensional screen printing of objects on a three-dimensional screen printing machine, it is necessary to implement the process of curing and/or drying in the printing machine. Whereas with conventional screen printing techniques, the drying of the print takes place in accordance with the prior art on separately attachable machines, which do not directly engage in the printing process of the screen printing machine and are usually operated continuously, in the 3-dimensional screen printing machine for the production of objects by the 3-dimensional screen printing process this must be controlled by the location of the print objects in the screen printing machine for an extended period of time and according to a plurality of printing and curing operations on the building object, as well as the need for long-term fixation of the printing base of the object to maintain positional stability during the entire print time; curing as well as warming of the object arising from temperature effects, with the print objects carrier and the press bed located beneath, while minimizing the heat load of the drive and guide elements under the press bed or beds, thus allowing maximization of cycle times. Allowing for environmental considerations and for minimizing the required footprint of the 3-dimensional printing machine, as well as taking into account the changing material properties of the formula within the building printing object, the functioning of the curing system or systems in particular but not exclusively for the multiple use of one or more press beds with an occupancy of the press bed with at least one printing surface up to a layout size-dependent maximum number of surfaces of a press bed, consists of the individual functions:

Curing process with or without the addition or removal of media such as air, gas, humidity, reagents, vapors, dusts, mists, or drops, preferably finely and homogeneously distributed in each case. The curing process itself is controlled by time and/or temperature and/or quantity, wherein the nature of the mode of action of curing can change over the period of curing. Curing takes place at least in the press bed surface covered by print surfaces and should not change in their surface dimensioning during the time of the entire object production. The curing system has the capacity to direct the action of curing, for example, the direction of radiation of an IR or UV lamp from the same or different directions onto the building object. If heat or vapors arise from the curing process, a device is provided for suctioning them off, but suctioning preferably is not solely upward, so as to minimize an inhomogenizing effect from currents arising on the object surface or in structured objects inside the structures. In most cases, the curing process is accompanied by heat development, if this does not affect the curing effect itself. The curing system(s) of the 3-dimensional printing machine is also equipped with a heat dissipating device such that upon completion of the time of curing effects, the atmosphere located above the object, preferably but not exclusively air with more or less gas leaving the object, rising heat and/or moisture in the form of water or solvents or volatile components of the formulation of the mixture with which the object has been printed, or a composition thereof, wherein this may also be a previously supplied curing agent, is discharged. Tempering of the object to a previously determined and fixed temperature is also associated with the removal.

The distance between the object and the curing element must be viewed as essential for curing. This distance is crucial for the effect, intensity, duration, and duty cycle of the curing device. Experiments have determined that it is not necessary to raise the curing system in the narrow limit of the printing plate height change, but this can be done at intervals in the millimeter range.

If the height change is made by lowering the whole press bed, there is no need for an additional change in position of the curing system, since the distance of the curing element to the object surface then does not change. If the height change is made, however, by means of the printing superframe or the printing mechanism with screen holder, the curing system must be adjusted in distance within predetermined intervals by the height of the printing object or objects. In some cases, the curing requirement must be met as a function of time and/or as a function of object height, because the absorption properties of the object can change with increasing object height. The distance between the printing object top and curing element is corrected in time and/or distance and/or intensity. Curing system height adjustment is comfortable if it coupled directly to the upper printing station mechanism and raised in parallel with this, On the other hand, the additional weight load on the upper printing station mechanism from the curing system coupling affects the positioning accuracy of the height adjustment significantly, so that this solution should be used only for coarser objects and less sensitive printing mixture formulas.

If the press bed is not in the curing process, the curing system or its curing elements must be switched off if possible, above all in order avoid unnecessary burdens loads on the underlying system equipment; in addition this operating mode significantly increases the energy efficiency of the entire 3-dimensional printing machine, which is different from conventional curing or drying systems for conventional printing, which are operated continuously as a rule.

Through the simultaneity of curing and if necessary cooling of all the surfaces of a press bed, at the same time the required time for them is expended only once, so that time expenditure required for a whole cycle of a press bed with a plurality of printing surfaces can be greatly reduced in comparison with, in the unfavorable case, a press bed covered with one surface. For example, in the single cycle of a press bed with one surface, if the print time is say 1.2 seconds, the curing time 45 seconds, and the cooling time 35 seconds, taken together with the time requirement of bed transport of likewise 1 second, more than 82.2 seconds will be required for a print position for one surface. The time requirement for the height adjustment of around 11 seconds is implemented within the curing time, so that no additional time is required. If the time is determined for a 20-copy surface, for the printing of 20 times 1.2 seconds 32 24 seconds, for the curing 1 times 45 seconds, for the cooling 1 times 35 seconds, for the transport 20 times 1 second within the printing station and 1 second for the transport from the printing station under the heating device. For the 20-copy surface then in total a time of 125 seconds is required. For 1 surface therefore for example 6.25 seconds.

Since already during the curing of the first press bed, the second press bed can be printed with the object, the 3-dimensional printing machine has no downtime. For a 20-copy object then the effective process time of a printed layer is 6.25 seconds, as an example. With the time reduction from the example, two significant parameters arise with a press bed with multiple objects:

The production time of the 3-dimensional printing machine, for example, is reduced to 7.7% compared to the single object of prototypes with a print object of a press bed and a curing system, which corresponds to an increase in unit capacity by a factor of 13.

When using two press beds, the factor is further improved in that, based on the example, the second press bed is printed immediately after the first press bed, while first press bed curing takes place, and thus the effectiveness of a object drops to 3.35 seconds.

Required times for mass proportioning, height change, etc. occur within the section overlaps, so that no additional time is needed. The effectiveness of the 3-dimensional printing machine is determined in its time requirements mainly by the curing time and the object quantity. A reduction to less than 4% of the effective cycle time of a 3-dimensional printing machine compared with the existing prototype systems in single print with a press bed and one object graphically illustrates the effectiveness of the 3-dimensional printing machine technology made and claimed with the invention.

The reduction of the cycle time already occurs with two press beds with one or two curing systems and one object per print table, or even with one press bed with more than one object. In this special case, the second object can also be a second medium which is consecutively printed in the printing station, which is then equipped with two screens and two doctor blades.

The calculation example cited is determined for a material with combination curing by heat/radiation with high heat storage capacity, high reflectance in the grain, and porosity of almost 50% by volume.

The third essential component group of a 3-dimensional screen printing machine is the upper print mechanism that performs the printing, with printing mechanism frame, doctor blade unit drive, and doctor blade unit mechanism with integrated measuring devices and controls. Contrary to conventional screen printing machines for lithographic printing, the function and setup of the printing superframe with screen holder, screen positioning, and printing mechanism is of crucial importance for the functionality of the 3-dimensional screen printing. Contrary to prior art in the classic graphical and technical screen printing, an error resulting from the printing superframe in 3-dimensional screening printing is added to with every printing layer of the object. Error summations on the object surface may include waves, unequal height distribution, areas with more or less printout, and open defects without material application areas, In particular, in 3-dimensional screen printing processes on an 3-dimensional screen printing machine it is not possible to test the settings and continuations by so-called proofs. On the contrary, in the 3-dimensional screen printing method, it is a compulsory requirement that the first printing and all subsequent printings, even after screen cleaning, mixture change, layout change, material change, or print interruption, in positioning, print image homogeneity, print job thickness and layout alignment with the underlying print layer, are perfectly formed without proof. A faulty first print or a faulty print in one of the following print layers inevitably leads to failure of the printing object and thus of the object, even it for example, out of four thousand print layers only another 20 print levels, for example, are to be printed.

This necessary printing perfection, which can also be used as an improvement in conventional screen printing systems for classic screen printing, is achieved by the special design of the screen holder, of the positioning system, of the doctor blade unit drive, the doctor blade unit, and the superframe structure.

The screen holder of a 3-dimensional screen printing machine must be designed for a flat screen and for a round screen with an overlying as well as a hanging screen as a statically stable structure. In particular the application surfaces for the screen edge in the screen holder must be designed as a plane parallel rail, which does not warp with an uneven screen frame shape, or thickness differences in adhesive and screen mesh, or screen frame warping, even under the effects of screen clamping. The compensating resilience of the screen holder applied according to the prior art results in an uncontrollable dislocalization of the screen mesh horizontal position in the X-Y direction and to a change in the screen tension. But since no screen is like another, both in frame and in mesh, and thus constitutes the greatest error source generally for 3-dimensional screen printing and the 3-dimensional screen printing machine, arising due to uneven adhesive application, frame strength differences, frame warping, mesh warping, an intense temperature and moisture dependency and constant screen parameter change over the screen history. In order to align a printing screen plane parallel to the press bed setup in a 3-dimensional screen printing machine, it has proven advantageous for the 3-dimensional screen printing machine to arrange the screen holder rail separately at each corner point in its distance to the printing substrate. The measure for the adjustment is the unloaded screen mesh, or for smaller screens also the inner edge of the screen frame. Here the screen holder displacement toward the press bed surface is preferably plane parallel. When operating with low screen tensions, it is also possible to align the screen anti-parallel, as here due to shear forces on the screen mesh during application, the screen tension with increasing distance from the frame. Contrary to conventional methods, it has also been shown that the screen fastening directly after positioning leads to unsatisfactory results. The more accurate the positioning has to be, the more prone to misplacement conventional screen clamp and positioning system is. In particular, all positioning systems end with the measurement and evaluation endpoint. This is followed by clamping. However, in 3-dimensional screen printing there is no possibility of correction by means of proofs, so that an identified dislocalization could be corrected by the clamping operation. In the 3-dimensional screen printing machine, screen positioning is performed by the detection of at least 2 registration marks, preferably but not exclusively illuminated from below, if the cameras detect the mark from above, or from above, if the marks are detected from below. The most optimal positioning position is on the center line of the Y axis of the layout. Other positions are also possible. Optionally in the 3-dimensional screen printing machine a screen-specific correction value is introduced, which allows for screen change parameters such as stretch change, humidity change, temperature change, mass weight load change or screen frame changes. It is practical if the registration marks are not within the sphere of influence of the doctor blade unit or flood path. Of course it is also possible to integrate the registration marks in the print layout. Classic simple positioning by pen, stencils, or the like have not been found accurate enough for 3-dimensional screen printing technology, nor has positioning using the screen frame. If the positioning is performed, in the mother frame structure for the flat screen and round screen, the screen is fixed in the mother frame and the mother frame preferably but not exclusively is positioned and fixed at two corner points and a middle axis manually, pneumatically, hydraulically, or by motor. The position deviation arising during fixation is detected, the mother frame released and newly positioned, and corrected by the registered position deviation of the first fixation. Then comes the second fixation. In some cases this process must be carried out several times in order to achieve positioning of the screen in the μm range. It has been shown that conventional screen positioning with camera support have long evaluation times for this required precision—at times lasting for hours—and do not detect, evaluate, or correct position changes occurring after the positioning. Approaches were analogous for the solid frame structure for flat screens and round screens.

Since basically in the three-dimensional screen printing method with 3-dimensinaler screen printing machine, one proceeds from the fact that the application axes run plane parallel to the press bed surface, the press bed surface or for prints in progress the already printing object surface, is the reference surface for screen positioning, both with one object structure or with several object structures. If the positioning on the other hand is manual or semiautomatic, for the detection of the reference mark position, a large projection of the reference mark imager or imagers is produced, and the screen position is set by means of assistive marks or required reference marks. The adjustment of the screen axes is implemented by means of adjustment elements by motor, pneumatic, or hydraulic systems or by numerical preset values manually or semi-automatically or automatically, Figure III shows the adjustment positions of the screen position for plane parallel orientation of the screen to press bed number 7; the adjustment positions of the screen for the layout orientation in number 8 shown. The screen frame is marked 9, and actual layout in the screen mesh, for example for a flat: screen, 10. Analogous positions for the round screen.

Figure IV represents the adjustment scheme of the doctor blade unit path.

Number 16 indicates the blade beam to which the blade is fixed; 18 the blade holder fixture with adjusting pivot axes; and number 17 shows the doctor blade receiver.

Number 10 indicates the position-stable lift-triggering mechanics, hydraulics, pneumatics, or motor system, and number 9 the sliding lift-triggering mechanics, hydraulics, pneumatics, or motor system, with displacement 15 in Y-axis direction. The blade holder fixture is rotatable in position 11, but not displaceable, and oppositely displaceable in the Y-axis direction 14 and swiveling on the circular segment path 12. Attached to the fixed-position blade holder bar 13 is the actual blade 17, secured against rotation and displacement, even when loaded by the changing doctor blade unit pressure during the printing phase, in which the blade rests on the printing substrate and in further printing rests only on the already printing object. Not shown is the left- and right-side height-adjustable stop or the associated measurement devices. This adjustability, unusual for doctor blade units, is based on the negative results of conventional doctor blade units, such as doctor blade units with doctor blade unit pressure balance, usually pneumatic, with doctor blade unit pressure adjustment, usually with a fast electronic pressure controller or simple piston-rod controlled cylinders for doctor blade unit pressure and doctor blade unit stroke with end-position damping plates. It is a common feature of conventional systems that they reaction, that is, take action after onset of an event. In the 3-dimensional screen printing machine, the blade solely because of the repositioning capacity must site over up to a thousand printings always parallel to the screen mesh, lie on this to the left and right equally on the printing substrate or on the already present object, and be held over the complete object covering blade path at a constant height, without changing the application values, associated also with a constancy in the angling of the blade edge. The fame applies to the flood bar. Contrary to the prior art for the 3-dimensional screen printing machine, a speed influence of the lift-triggering mechanics, pneumatics, or motor systems has proven useful, but not their end application behavior. Here in the 3-dimensional screen printing machine, throttling and damping is used, but not to the end; the doctor blade receiver itself however is placed on one or more fixed adjustable non-buffered stops and pressed in such a way that during the printing process, no height position change or evasive movement can take place. Flood and printing doctor blade units can be detected by controls or measurement systems independently of one another or controlled jointly. Here the form arrangement of the doctor blade unit and flood bar for separate control, for mass-limiting control, or for closed flooding between flood bar and doctor blade unit in the 3-dimensional printing machine must be implemented. Depending on the formula material, there is also the possibility to perform the flooding immediately before printing, so that the screen mesh is not mass-loaded in the printing process.

In the 3-dimensional screen printing machine there are correction options for all axial positions in the form of differential preferences and settings from the ideal position. This is necessary for example in long-term printing if the mass is concentrated in the screen angle direction, or the screen mesh of the screen tool on the height adjustment path deviates more in one direction than should be the case for the other screens in structure and/or screen change.

In conclusion, for the 3-dimensional screen printing machine it should be noted that due to the demand for long-acting positional certainty and positional certainty even in the first printing, the use bearing combination floating bearing-fixed bearing leads to large variations in position, certainly in the millimeter range, which owing to the resulting position and application thickness changes can lead only to moderately accurate object dimensions, or due to the accumulation of generated application thickness differences, to print cancellation. By contrast, the bearing combination of fixed bearing-fixed bearing, in particular due to the controlled framework conditions, has proven optimal for a displacement-free and height constant object printing on a 3-dimensional screen printing machine.

For the precision of a 3-dimensional printing machine it is of decisive importance that, contrary to conventional technologies with a reference position beyond the machine lifespan, this is not sufficient for accuracies in the pm range of a 3-dimensional screen printing machine. Inevitable wear of the guides, the drives, and the moving parts is here compensated by the fact that with every print start of a new print process for the production of objects in the 3-dimensional screen printing method, a new reference point is always determined, from which the respective new printing process is started for a 3-dimensional printing object. This ensures in the 3-dimensional screen printing machine that only the wear that occurs during a single production run can affect the precision of the print result. With a determination of the reference point for each manufacturing process, the cycle of repair and maintenance or failure of the 3-dimensional printing machine for exceeding tolerance warnings or limits is widened significantly with no negative effect on the printing object The three-dimensional screen printing machine enables the use the 3-dimensional screen printing technology for the production and use of objects and in accordance with FIG. 1 combines the system components of the printing station, FIG. I, No. 2.; printing superframe, FIG. I, No. 1; one or more press beds. FIG. I, Nos. 3 and 4; one or more curing stations FIG. I, Nos. 5 and 6 such per press bed one or several objects can be printed successively on the press bed, and subsequently can be cured jointly and at the same time. During the curing of the first press bed, the second and possibly further press beds are printed and then cured. Following the curing of the printed body layer, for the following print layer the height adjustment is made by the height of the previously printed printing layer. The 3-dimensional screen printing machine has it is precision capacity a number of special setting and functional elements, which through special bed structure, height adjustments, positioning system methods, a specially conceived and executed blade and flood method for the 3-dimensional screen printing machine, and a flexibly equippable integrated curing system, increases the efficiency of the 3-dimensional screening printing process by at least 10% with respect to adapted conventional flat bed screen printing machines from research and development of the 3-dimensional screen printing process, and at the same time, along with layout changes, allows 3-dimensional precision printings in the object layers. Objects produced with the 3-dimensional screen printing technology include 3-dimensional objects made of ceramic, metal, glass, plastic, organic or inorganic materials, biological materials, or mixtures thereof, and can be produced and used with or without a 3-dimensional structure.

List of abbreviations used in the invention description:
Z=null position of the press bed; A=height adjustment; H=application thickness of a printing
$\Sigma$=sum; f(x)=function; N=quantity of print copies; X=transport direction
Y=ordinate axis; $\Delta$=delta; FIG.=Figure; Nr=number

What is claimed is:

1. A system for the production of three-dimensional screen-printed articles, comprising a four-column lifting-unit, at least one press bed, a measurement and control device, and a printing screen, by means of which at least one printing object is multiply printable, wherein after each printing, the four-column lifting-unit lifts at least the printing screen or lowers the at least one press bed by a value of an application thickness of a previously printed layer to increase a value of a screen lift-off of the printing screen by the value of the application thickness of the previously printed layer, the screen lift-off being a distance extending from the printing screen to the at least one printing object, and wherein the value of the application thickness of the previously printed layer is determined with the measurement and control device by subtracting a height value of the screen lift-off and the at least one printing object prior to printing another layer from a measurement of a height value of the screen lift-off and the at least one printing object following printing of the another layer.

2. The system for the production of three-dimensional screen-printed articles according to claim 1, wherein the press bed comprises a plate having a number of printing objects.

3. The system for the production of three-dimensional screen-printed articles according to claim 2, wherein the plate with the printing objects can be transported to a curing system.

4. The system for the production of three-dimensional screen-printed articles according to claim 2, wherein the plate comprises a plurality of positioning marks.

5. The system for the production of three-dimensional screen-printed articles according to claim 4, wherein at least one positioning mark is assigned to each printing object.

6. The system for the production of three-dimensional screen-printed articles according to claim 1, wherein a doctor blade is raised with the printing screen by an amount of the application thickness of the previous printing.

7. The system for the production of three-dimensional screen-printed articles according to claim 1, wherein the press bed is fixed to the four-column lifting-unit.

8. The system for the production of three-dimensional screen-printed articles according to claim 1, wherein after printing of the press bed with a printing object, the screen lift-off is changed between 0.2 µm and 250 µm before a subsequent printing of a next height-building printing layer is carried out.

9. The system for the production of three-dimensional screen-printed articles according to claim 1, wherein the press bed, after printing of all printing objects of a plane position, is fully transportable under a curing system, where the curing of the printing layer can be carried out at the same time, wherein the curing system distance from the building-up height of the object is adjusted, wherein during and/or after the curing, temperature control of the object is performed, which is supported by gas treatment or moistening of the atmospheric composition and homogenization of the surface properties of the object.

10. The system for the production of three-dimensional screen-printed articles according to claim 1, wherein an upper printing mechanism of the press bed comprises a screen holder, a height position of which is individually or automatically adjustable in all axial points, and with which the printing screen may be oriented plane parallel or parallel with correction values with respect to the press bed or an object surface, and which comprises more than one screen positioning element by which the printing screen may be oriented, wherein a positioning and registration mark detection and evaluation proceed beyond a screen or frame or other frame clamping process, with follow-on positioning after a first positioning process to prevent dislocalization by the clamping process wherein the printing screen is positioned by means of registration marks integrated in the printing screen, which are designed as transparent marks, by means of suitable cameras and illumination, and in which a measurement of a position of the printing screen is contactless, with a possibility of manual, semiautomatic, or automatic adjustment of the height position of the screen holder over all corners and sides of a screen frame, or a screen layout orientation adjustment by means of visual projection of the registration marks or by means of electronic evaluation with register accuracy in a µm range.

11. The system for the production of three-dimensional screen-printed articles according to claim 1, wherein a control and regulation of an open or closed printing flood bar are configured in such a way that a lower edge of a printing doctor blade is placed plane-parallel onto the printing screen or a stencil at a presettable position on a left or right side at a same time, the lower edge of the printing doctor blade presses a screen mesh of the printing screen or the stencil down parallel onto printed material or onto already printed layers of an object, and subsequently, by means of an adjustable stop for a doctor blade proof stop position, implements a blade proof, wherein a movement processes can be influenced by means of suitable damping elements, without a risk of a stop point of a doctor blade lift being influenced by usual damping elements at the stop, with deviating reproduction values, such that an adjustability of the printing doctor blade and flood bar mechanics comprises an always in-plumb acting hydraulic or pneumatic or motor drive, on two sides, to which a doctor blade of a flood bar holder is connected in such a rigid way that by means of a fixed-position rotary bearing at one side, and a swivel bearing displaceable and lockable in an Y-axis direction at another side, a doctor blade orientation at an application point on the screen mesh of the printing screen or on the stencil and an application region on the printed material or the already printed layers of the object as well as the blade proof during the printing process are always parallel, without screen tension differences, layout density differences, mass friction resistances, or other subordinate influential parameters allowing a change in position of the lower edge of the printing doctor blade edge and possibly a flood bar edge, such that conventionally occurring balancing movement processes in a course of a doctor blade path over the printed material cannot occur, and wherein a doctor blade unit is equipped with suitable, contactless measurement devices, by means of which positions and printing conditions of the lower edge of the printing doctor blade and possibly also the flood bar edge are detected and evaluated, and measurement results of which can be incorporated in a setting of the fixed values of doctor blade control.

12. The system for the production of three-dimensional screen-printed articles according to claim 1, wherein a cycle of the three-dimensional screen printing machine with respect to a printing object in a multiple printing object printing process is at least 10% shorter than in a screen printing system with one printing object.

13. The system for the production of three-dimensional screen-printed articles according to claim 1, having a three-dimensional object, wherein several printing layers form an object on at least one printing object, and a number of printing layers on one or several object(s) are detected by a manual or automatic version of the measurement and control device.

14. The system for the production of three-dimensional screen-printed articles according to claim 1, wherein with the three-dimensional screen printing system, objects can be made of ceramic, metal, glass, plastic, additional organic or inorganic materials, biological materials, or mixtures thereof.

* * * * *